United States Patent
Tanaka et al.

[11] Patent Number: 6,114,688
[45] Date of Patent: Sep. 5, 2000

[54] LENS FOR A LIGHT DETECTOR

[75] Inventors: Kozo Tanaka; Hideyuki Kamiyama, both of Hadano, Japan

[73] Assignee: Stanley Electronic Co., Ltd., Tokyo, Japan

[21] Appl. No.: 09/138,679

[22] Filed: Aug. 24, 1998

[30] Foreign Application Priority Data

Aug. 26, 1997 [JP] Japan .................................. 9-229410

[51] Int. Cl.[7] .................................. G02B 3/08; G01J 5/08
[52] U.S. Cl. .......................................... 250/216; 359/741
[58] Field of Search ................................. 250/216, 208.1, 250/214 R, 214.1, 353; 359/708, 710, 719, 741, 742, 743

[56] References Cited

U.S. PATENT DOCUMENTS

| | | | |
|---|---|---|---|
| 4,792,685 | 12/1988 | Yamakawa | 250/353 |
| 4,800,278 | 1/1989 | Taniguti et al. | 250/353 |
| 4,904,069 | 2/1990 | Nakata | 359/710 |
| 4,933,560 | 6/1990 | Messiou et al. | 250/353 |
| 5,022,725 | 6/1991 | Matsunami et al. | 250/353 |
| 5,450,244 | 9/1995 | Fantone | 359/719 |
| 5,485,317 | 1/1996 | Perissinotto et al. | 359/708 |
| 5,526,190 | 6/1996 | Hubble, III et al. | 359/710 |
| 5,805,355 | 9/1998 | Natsuno | 359/719 |

*Primary Examiner*—John R Lee
*Attorney, Agent, or Firm*—Morgan, Lewis & Bockius LLP

[57] ABSTRACT

A light detector comprising a photo sensing chip having a light detecting surface, a cylindrical converging lens to collect incident light from different directions to a light detecting surface, at least one electrode connected to the photo sensing chip, a light detecting surface, and in a cross-sectional view along the axis Z of the light detector, one end of the lens is comprised of a central spherically curved surface having a first radius of curvature, and a peripheral spherically curved surface having a second radius of curvature. In another aspect of the invention, a flat surface is further arranged between the central spherically curved surface and the peripheral spherically curved surface. In the invention, the lens is comprised of just one lens element, and is formed by resin molding.

18 Claims, 3 Drawing Sheets

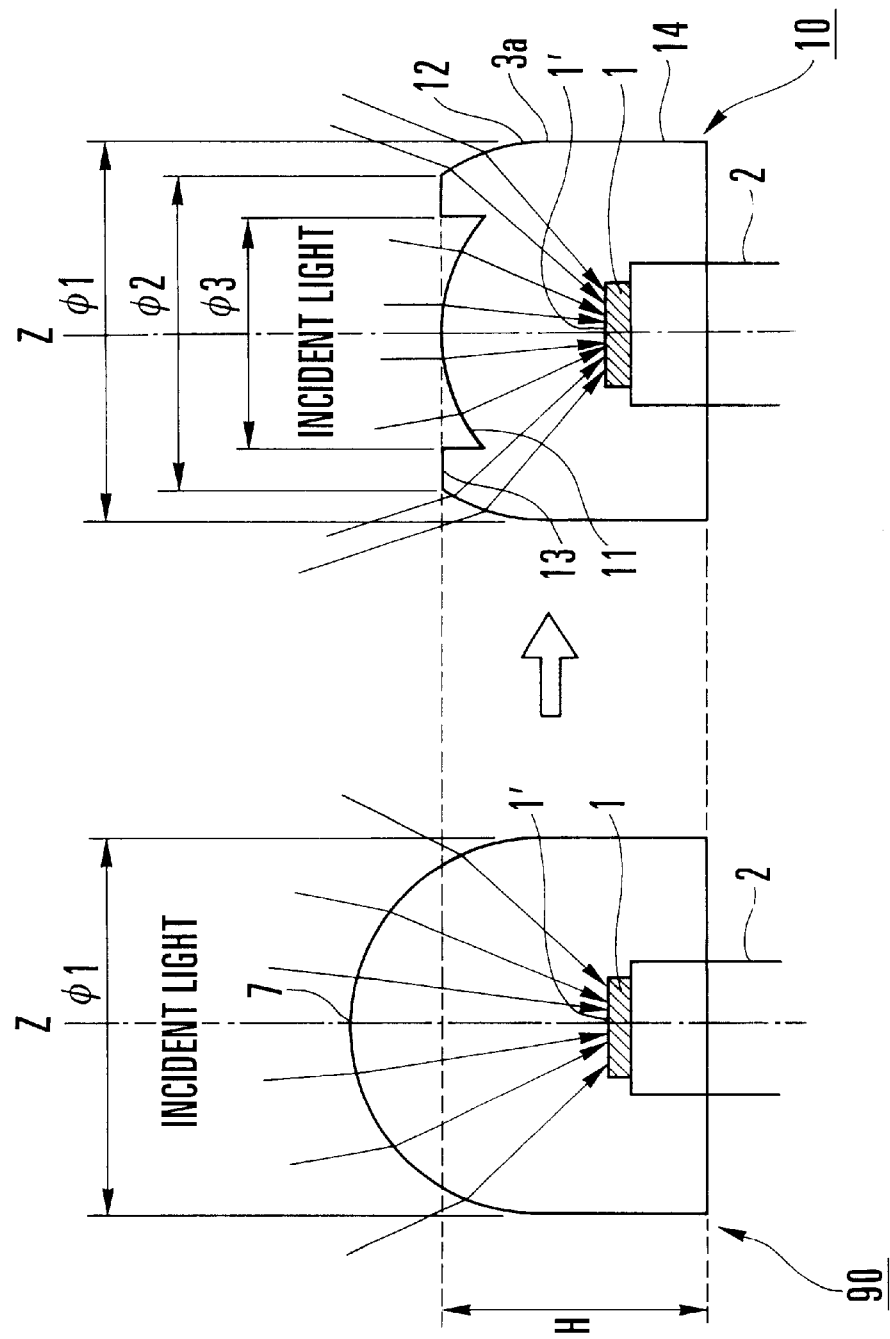

LENS FOR A LIGHT DETECTOR

This invention claims the benefit of Japanese Patent Application No. 09-229410, filed on Aug. 26, 1997, which is hereby incorporated by reference.

BACKGROUND OF THE INVENTION

1. Field of the Invention

The present invention relates to a light detector and more particularly to a converging lens to collect light emitted from different directions on a light detecting surface to reduce the overall size of the light detector.

2. Discussion of the Related Art

A light detector for use as a photo diode, or the like, generally needs to have a large converging lens to efficiently convert from light to electric power. FIG. 3(a) is a cross-sectional view along a longitudinal axis Z of a conventional light detector 90 having a lens 3 formed by resin molding. FIG. 3(b) is a cross-sectional view along an axis Z in a focusing direction of another conventional light detector 90' whose envelope is a combination of a cylindrical case 4 having an aperture on one end, and a converging lens 5 covering the aperture.

The light detector 90 in FIG. 3(a) comprises a photo sensing chip 1 having a light detecting surface 1', at least one electrode 2 connected to the photo sensing chip 1, and a lens 3 having a spherically or non-spherically curved end 7. In this composition, directivity is determined by a distance L from the light detecting surface 1' of the photo sensing chip 1 to the curved end 7 of the lens 3 and a radius of curvature of the curved end 7. A larger lens 3 is used to obtain larger light detection output while keeping the directivity.

The conventional light detector 90' in FIG. 3(b) comprises a photo sensing chip 1 having a light detecting surface 1', at least one electrode 2 connected to the photo sensing chip 1, a cylindrical case 4 having an aperture on one end, and a converging lens 5 covering the aperture. In this composition, the length L' from the light detecting surface 1' of the photo sensing chip 1 to the top portion 5a on the convex surface of the converging lens 5 is smaller than the length L of FIG. 3(a) to reduce the overall size of the light detector 90'.

The conventional light detectors 90 and 90' each have several problems. As shown in FIG. 4, it is difficult to obtain sufficient directivity onto the photo sensing chip 1 and light incident to the lens 3 when the height h from the substrate 6 to the curved end 7 of the lens 3 is limited.

The light detector composition 90 in FIG. 3(a) minimizes the amount of undetected incident light rays because the lens 3 is a single unit instead of a combination of a lens and a case. However, since the directivity is determined by both the distance L from the light detecting surface 1' of the photo sensing chip 1 to the curved end 7 of the lens 3 and the radius of curvature of the curved end 7 of the lens, a diameter ø of the lens 3 has to be enlarged to obtain a sufficient amount of incident light while maintaining sufficient directivity. Accordingly, the height h also must be enlarged.

As for the light detector 90' as shown in FIG. 3(b), the transmitting efficiency of the incident light through the lens 5 is low because air exists between the light detecting surface 1' of a photo sensing chip I and the converging lens 5. Further, the composition of the light detector 90' does not allow for the reflowing mounting method.

SUMMARY OF THE INVENTION

The present invention is directed to a light detector that substantially obviates one or more of the above problems due to the limitations and disadvantages of the related art.

An object of the invention is to provide a light detector with a smaller overall size that maintains a sufficient amount of incident light and sufficient directivity, and that is composed so that the light detector can be mounted on a substrate satisfying strict dimension limits.

According to the present invention, the above object is achieved by providing a light detector comprising a photo sensing chip having a light detecting surface, a converging lens to collect incident light from different directions on the light detecting surface, at least one electrode connected to the photo sensing chip, and in a cross-sectional view along the axis Z of the light detector, one end of the converging lens is comprised of a central spherically curved surface having a first radius of curvature, and a peripheral spherically curved surface having a second radius of curvature.

In another aspect of the invention, the above objects are achieved by providing a light detector comprising a photo sensing chip having a light detecting surface, at least one electrode connected to the photo sensing chip, a cylindrical converging lens to collect incident light from different directions to the light detecting surface, one end of the cylindrical converging lens being on an opposing side to the light detecting surface and the electrode, the cylindrical converging lens further comprising a central spherically curved surface having a first radius of curvature and a first maximum vertical distance from the light detecting surface, a peripheral spherically curved surface having a second radius of curvature and a second maximum vertical distance from the light detecting surface, and a flat surface arranged between the central spherically curved surface and the peripheral spherically curved surface, having a third maximum vertical distance from the light detecting surface, wherein the first, second, and third maximum vertical distances from the light detecting surface are equal.

In yet another aspect of the invention, the above objects are achieved by providing a light detector comprising a photo sensing chip having a light detecting surface, at least one electrode connected to the photo sensing chip, a cylindrical converging lens to collect incident light from different directions to the light detecting surface, one end of the cylindrical converging lens being on an opposing side to the light detecting surface and the electrode, the cylindrical converging lens further comprising a central spherically curved surface having a first radius of curvature and a first maximum vertical distance from the light detecting surface, a peripheral spherically curved surface having a second radius of curvature and a second maximum vertical distance from the light detecting surface, and a flat surface arranged between the central spherically curved surface and the peripheral spherically curved surface, having a third maximum vertical distance from the light detecting surface less than the first and second maximum vertical distances from the light detecting surface.

In another the above objects are achieved by providing a light detector comprising a photo sensing chip having a light detecting surface, at least one electrode connected to the photo sensing chip, a cylindrical converging lens to collect incident light from different directions to the light detecting surface, one end of the cylindrical converging lens being on an opposing side to the light detecting surface and the electrode, the cylindrical converging lens further comprising a central spherically curved surface having a first radius of curvature and a first maximum vertical distance from the light detecting surface, a peripheral spherically curved surface having a second radius of curvature and a second maximum vertical distance from the light detecting surface, and a flat surface arranged between the central spherically curved surface and the peripheral spherically curved surface, having a third maximum vertical distance from the light detecting surface equal to the second and less than the first maximum vertical distances from the light detecting surface.

In the invention, the lens may be comprised of just one lens element, and may be formed by resin molding.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention.

In the drawings:

FIGS. 1(a) and 1(b) are diagrams comparing compositions between the conventional light detector and a first preferred embodiment of the present invention.

FIG. 1(a) illustrates a cross-sectional view along a lens axis Z of a first conventional light detector.

FIG. 1(b) illustrates a cross-sectional view along a lens axis Z of a first preferred embodiment of the present invention.

DETAILED DESCRIPTION OF THE PREFERRED EMBODIMENTS

Figure 2A:
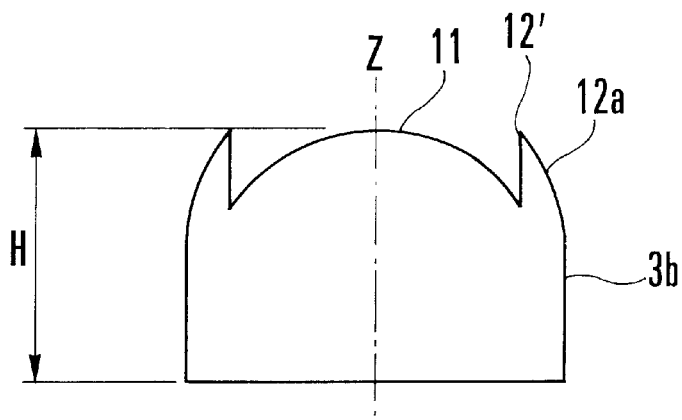
FIG. 2(a) illustrates a cross-sectional view along a lens axis Z of a second preferred embodiment of the present invention.

Reference will now be made in detail to the preferred embodiments of the present invention, examples of which are illustrated in the accompanying drawings.

FIG. 1(a) illustrates a cross-sectional view along a lens axis Z of a conventional light detector 90, and FIG. 1(b) illustrates a cross-sectional view along a lens axis Z of a first preferred embodiment of the present invention.

A light detector 10 in FIG. 1(b) comprises a photo sensing chip 1 having a light detecting surface 1', at least one electrode 2 connected to the photo sensing chip 1, a lens 3a comprising a cylindrical portion 14, a central spherically curved surface 11 having radius x of curvature, a peripheral spherically curved surface 12 having radius y of curvature, and a flat surface 13 between the central spherically curved surface 11 and the peripheral spherically curved surface 12. The central spherically curved surface 11, the peripheral spherically curved surface 12, and the flat surface 13 are formed on a cylindrical end on an opposing side to the light detecting surface 1' and the electrode 2. Diameter $\phi 1$ of the lens 3a is larger than internal diameter $\phi 2$ of the peripheral spherically curved surface 12, and the internal diameter $\phi 2$ is equal to or larger than diameter $\phi 3$ of the central spherically curved surface 11. Radius x of curvature of the central spherically curved surface 11 is equal to or different from the radius y of curvature of the peripheral spherically curved surface 12. Centers of radii x and y of respective curvatures are both along the lens axis Z. The flat surface 13 between the internal diameter $\phi 2$ of the peripheral spherically curved surface 12 and the diameter $\phi 3$ of the central spherically curved surface 11 arranged to achieve sufficient strength of the lens and to facilitate to handle with raw material of the lens 3a, resin, in mass-production.

The operational advantages of the light detector 10 according to the preferred embodiment of the present invention will now be described. First, overall size reduction of the light detector 10 is achieved while maintaining predetermined directivity and a sufficient amount of incident light. This composition is available for use in small spaces for mounting the light detector 10 on a substrate. The length of the light detector 10 along a focusing direction is the same as H, a maximum height for mounting the light detector 10 on a substrate. In the light detector 10, as shown in FIG. 1(b), directivity and the amount of incident light is determined by radius x of curvature of the central spherically curved portion 11, and radius y of curvature of the peripheral spherically curved portion 12. Directivity depends on the radius x of curvature of the central spherically curved surface 11, and the amount of incident light depends on radius y of curvature of peripheral spherically curved surface 12.

In a conventional light detector 90 shown in FIG. 1(a) on the other hand, the amount of incident light depends on the diameter of the lens 3, and directivity depends on radius y of curvature of the spherically or non-spherically curved end 7 of the lens 3. When length H in a focusing direction is limited, even if the diameter of the lens 3 is large enough, it is difficult to obtain sufficient directivity, since the diameter of the lens 3 limits the radius y of curvature of the curved end 7 in specific values.

Second, directivity is more flexibly determined in the present invention. For example, high directivity is obtained by enlarging radius x of curvature of the central spherically curved surface 13. In another example, high directivity is obtained by the combination of different radii of curvatures between the central spherically curved surface 11 and the peripheral spherically curved surface 12.

Figure 2B:
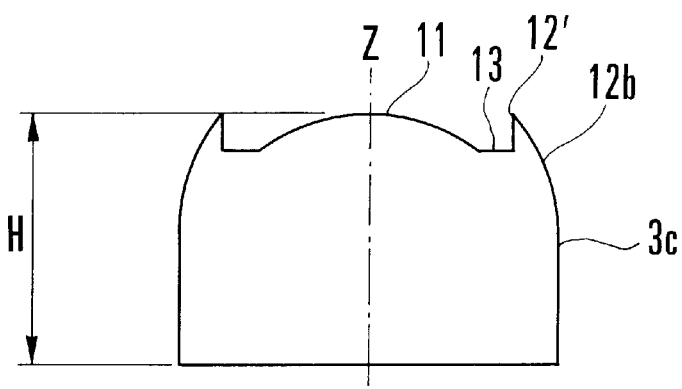
FIG. 2(b) illustrates a cross-sectional view along a lens axis Z of a third preferred embodiment of the present invention.
Figure 2C:
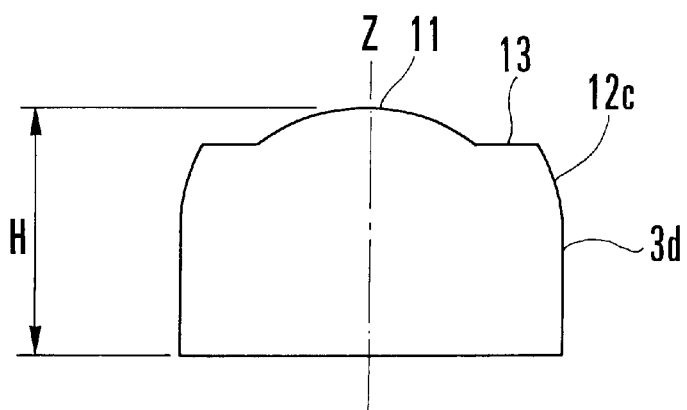
FIG. 2(c) illustrates a cross-sectional view along a lens axis Z of a fourth preferred embodiment of the present invention.
Figure 3A:
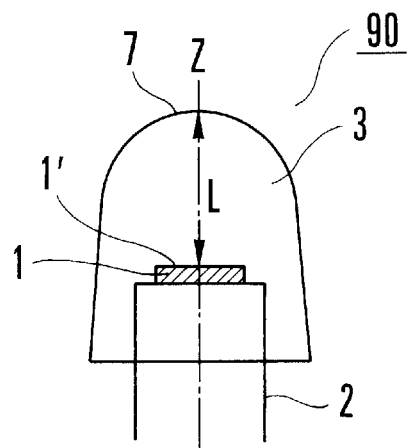
FIG. 3(a) illustrates a cross-sectional view along a lens axis Z of a first conventional light detector.
Figure 3B:
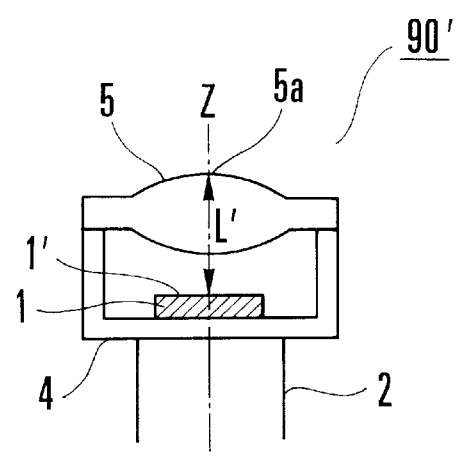
FIG. 3(b) illustrates a cross-sectional view along a lens axis Z of a second conventional light detector.
Figure 4:
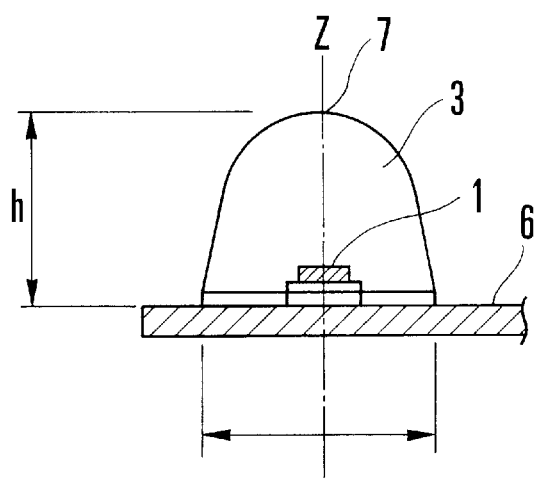
FIG. 4 illustrates a cross-sectional view along a lens axis Z of a first conventional light detector when it is mounted on a substrate.

FIGS. 2(a)–(c) illustrate further embodiments of the present invention. In these embodiments, corresponding portions, except the lens 3a, have the same configuration as the light detector 10 shown in FIG. 1(b). Accordingly, they are not illustrated or discussed. In FIG. 2(a), lens 3b does not have a corresponding portion to the flat surface 13 of FIG. 1(b). In lens 3c of FIG. 2(b), the position of the flat surface 13 is different from in lens 3a of FIG. 1(b). In the manufacturing process of the lenses 3b and 3c, accuracy and strength are required for top portion 12' of peripheral spherically curved surfaces 12a and 12b. In lens 3d of FIG. 2(c), a peripheral spherically curved surface 12c has a smaller curved portion than the peripheral spherically curved surface 12, 12a or 12b of FIGS. 1(b), 2(a), and 2(b), respectively. In this configuration, the amount of incident light is slightly less than other configurations, but the manufacturing process is the simplest among the above described lens configurations.

It will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A light detector comprising a photo sensing chip having a light detecting surface with at least one electrode connected to the photo sensing chip, and a cylindrical converging lens to collect incident light from different directions to the light detecting surface, the cylindrical converging lens being positioned to surround the light detecting surface, the cylindrical converging lens further comprising:
   a central spherically curved outer surface portion having a first radius of curvature; and
   a peripheral spherically curved outer surface portion having a second radius of curvature.

2. The light detector according to claim 1, wherein an internal diameter of the peripheral spherically curved surface is equal to a diameter of the central spherically curved surface.

3. The light detector according to claim 1, wherein an internal diameter of the peripheral spherically curved surface is greater than a diameter of the central spherically curved surface.

4. The light detector according to claim 1, wherein a length of the cylindrical converging lens on a focusing direction is equal to or less than a maximum length for mounting the light detector on a substrate.

5. The light detector according to claim 1, wherein the cylindrical converging lens is formed by resin molding.

6. A light detector comprising a photo sensing chip having a light detecting surface, at least one electrode connected to the photo sensing chip, a cylindrical converging lens to collect incident light from different directions to the light detecting surface, the cylindrical converging lens being positioned to surround the light detecting surface, the cylindrical converging lens further comprising:
   a central spherically curved outer surface portion having a first radius of curvature; and
   a peripheral spherically curved outer surface portion having a second radius of curvature, wherein the central spherically curved outer surface portion has a maximum height measured along an axis extending from the photo sensing chip that is approximately equal to a maximum height of the peripheral spherically curved portion measured along said axis such that a height of the cylindrical converging lens is reduced.

7. The light detector according to claim 6, wherein an internal diameter of the peripheral spherically curved surface is larger than a diameter of the central spherically curved surface.

8. The light detector according to claim 6, wherein a length of the cylindrical converging lens on a focusing direction is equal to or less than a maximum length for mounting the light detector on a substrate.

9. The light detector according to claim 6, wherein the cylindrical converging lens is formed by resin molding.

10. A light detector comprising a photo sensing chip having a light detecting surface, at least one electrode connected to the photo sensing chip, a cylindrical converging lens to collect incident light from different directions to the light detecting surface, the cylindrical converging lens being positioned to surround the light detecting surface, the cylindrical converging lens further comprising:
    a central spherically curved outer surface portion having a first radius of curvature and a first maximum vertical distance from the light detecting surface;
    a peripheral spherically curved outer surface portion having a second radius of curvature and a second maximum vertical distance from the light detecting surface; and
    a flat surface portion arranged between the central spherically curved outer surface portion and the peripheral spherically curved outer surface portion, having a third maximum vertical distance from the light detecting surface,
    wherein the first, second, and third maximum vertical distances from the light detecting surface are equal.

11. A light detector comprising a photo sensing chip having a light detecting surface, at least one electrode connected to the photo sensing chip, a cylindrical converging lens to collect incident light from different directions to the light detecting surface, the cylindrical converging lens being positioned to surround the light detecting surface, the cylindrical converging lens further comprising:
    a central spherically curved outer surface portion having a first radius of curvature and a first maximum vertical distance from the light detecting surface;
    a peripheral spherically curved outer surface portion having a second radius of curvature and a second maximum vertical distance from the light detecting surface; and
    a flat surface portion arranged between the central spherically curved outer surface portion and the peripheral spherically curved surface, having a third maximum vertical distance from the light detecting surface less than the first and second maximum vertical distances from the light detecting surface.

12. A light detector comprising a photo sensing chip having a light detecting surface, at least one electrode connected to the photo sensing chip, a cylindrical converging lens to collect incident light from different directions to the light detecting surface, the cylindrical converging lens being positioned to surround the light detecting surface, the cylindrical converging lens further comprising:
    a central spherically curved outer surface portion having a first radius of curvature and a first maximum vertical distance from the light detecting surface;
    a peripheral spherically curved outer surface portion having a second radius of curvature and a second maximum vertical distance from the light detecting surface; and
    a flat surface portion arranged between the central spherically curved outer surface portion and the peripheral spherically curved outer surface portion, having a third maximum vertical distance from the light detecting surface equal to the second and less than the first maximum vertical distances from the light detecting surface.

13. The light detector according to claim 1, wherein the cylindrical converging lens further comprises a flat outer surface portion arranged between the central spherically curved outer surface portion and the peripheral spherically outer curved surface portion.

14. The light detector according to claim 13, wherein the flat outer surface portion is substantially parallel to the light detecting surface.

15. The light detector according to claim 1, wherein the curvature of the cylindrical converging lens is discontinuous at a border between the peripheral spherically outer curved surface portion and the central spherically curved outer surface portion.

16. The light detector according to claim 15, wherein the cylindrical converging lens is symmetrical, and the curvature of the cylindrical converging lens is discontinuous at a border located on either side of a plane of symmetry for said converging lens and between the peripheral spherically outer curved surface portion and the central spherically curved outer surface portion.

17. The light detector according to claim 13, wherein the curvature of the cylindrical converging lens is discontinuous at a border between the peripheral spherically outer curved surface portion and the flat outer surface portion and at a border between the central spherically curved outer surface portion and the flat outer surface portion.

18. The light detector according to claim 6, wherein the cylindrical converging lens further comprises a flat outer surface portion arranged between the central spherically curved outer surface portion and the peripheral spherically curved outer surface portion.

* * * * *